No. 868,668. PATENTED OCT. 22, 1907.
I. F. KEPLER.
PROCESS OF MAKING HOLLOW RUBBER ARTICLES HAVING SEAMS.
APPLICATION FILED AUG. 4, 1905.
FIG. 1.
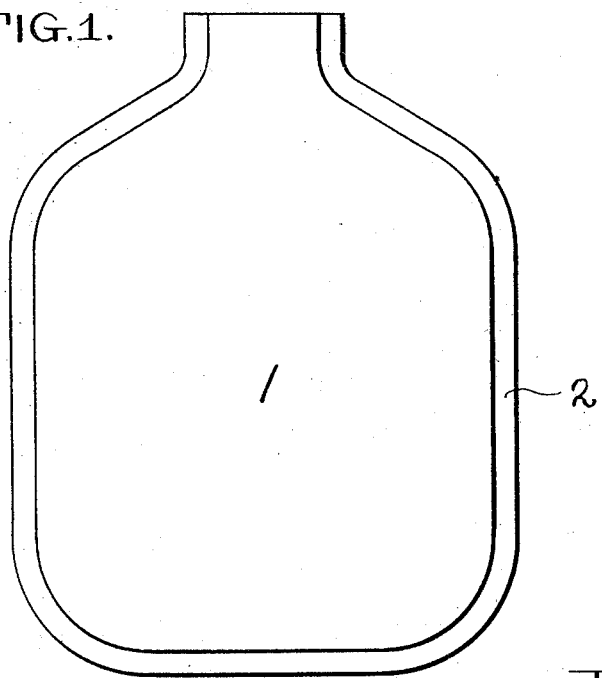
FIG. 2.
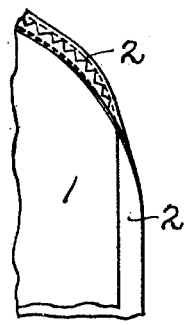
FIG. 3.
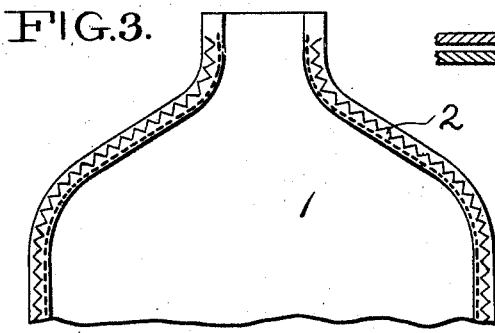
FIG. 4.
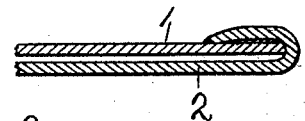
FIG. 5.
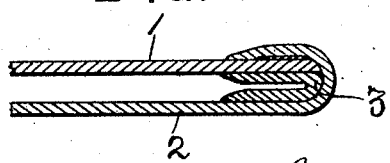
FIG. 6.
WITNESSES:
Oliver Williams
Frederick A. Blount
INVENTOR
Irwin Floyd Kepler
BY
Seward Davis
ATTORNEY

UNITED STATES PATENT OFFICE.

IRWIN FLOYD KEPLER, OF AKRON, OHIO, ASSIGNOR TO THE B. F. GOODRICH COMPANY, OF AKRON, OHIO, A CORPORATION OF OHIO.

PROCESS OF MAKING HOLLOW RUBBER ARTICLES HAVING SEAMS.

No. 868,668.　　　　Specification of Letters Patent.　　　　Patented Oct. 22, 1907.

Application filed August 4, 1905. Serial No. 272,726.

To all whom it may concern:

Be it known that I, IRWIN FLOYD KEPLER, a citizen of the United States of America, and a resident of the city of Akron, county of Summit, State of Ohio, have invented certain new and useful Improvements in the Process of Making Hollow Rubber Articles Having Seams, of which the following is a specification.

My invention relates to an improved process for making hollow articles from india rubber or other like materials, such for example as bag bodies used for hot-water bottles, syringe bags and analogous articles.

The object of my invention is to provide a method or process by which can be made a stronger, more durable and less expensive bag-body than can be made by any of the processes now in use.

The article which results from this process is made the subject of a companion application.

At present bag-bodies are made in several ways: Two sides or walls are cut from uncured sheet rubber, the two being made of the same size and the edges then united. This may be done in several different ways. For example, they may be joined by hand over a mandrel, or as described in my patent, No. 761,890, a piece of uncured rubber may be inserted between the edges before cutting the sides and the cutting and edge-joining done in a matrix die press. After these edges have been joined in any appropriate manner a binding strip of thin sheet rubber is cemented over the edge-joint around the periphery of the bag. These cemented parts are pressed together before affixing the necks, funnel, hanging and carrying straps, after which the whole is vulcanized.

The essential feature of my invention lies in the method of making these edge-joints, the object being to produce a more durable joint which shall, at the same time, be simpler and therefore less expensive, lessening the waste due to imperfect joints. I accomplish these objects by the process hereinafter described, reference being had to the accompanying drawings which form a part of this specification.

In the drawings Figure 1 shows the comparative size of the two sides and the manner of superposing the smaller on the larger. Fig. 2 illustrates the process of making the joint. Fig. 3 shows a portion of the bag-body having completed joints. Fig. 4 is a cross-section through the edge-joint. Figs. 5 and 6 show two methods of reinforcing the joint.

Throughout the drawings like reference numerals refer to like parts.

Two sides or walls of the bag-body 1 and 2 are cut from a sheet of unvulcanized rubber preferably by the use of matrix die presses, which may, at the same time, imprint upon the rubber any desired ornamentation. One side however is made of slightly larger area than the other. After dusting the surface of the larger sheet 2 with any suitable powder, in order to prevent the uniting of the two sides under the heat of vulcanization, the smaller sheet 1 is laid upon the larger sheet 2 as shown in Fig. 1. The projecting margin of the larger side is then coated with rubber cement or other adhesive material, turned over upon the smaller side and by pressure caused to adhere firmly in place. Fig. 2 shows the method of turning over this edge and Fig. 3 shows a portion of the bag-body at the completion of this step in the process. Fig. 4 is a cross-sectional view of the edge-joint. The funnel, screw-neck, carrying and hanging strap or any desired trimmings are then attached in the usual manner and the whole vulcanized by any of the usual methods.

If desired the edge-joint may be reinforced either by inserting a longitudinally folded strip of rubber 3, Fig. 5, beneath the edge of the side 1, before turning over the edge of the larger sheet or by attaching an outside binding 4, Fig. 6, after the joint is made, as is usually done at present. In practice, however, this reinforce is found to be unnecessary, the joint being practically as strong and durable as any other portion of the bag. This important result follows from the fact that the edge of the bag-body is able to resist strain or wear because it is not at the point of union of the two sides as in the ordinary bags, but is formed by a homogeneous portion of the larger side at some distance from its edge. Moreover the joint at that point is upon the inside of the bag while the outside joint is at some distance from the fold.

Having described my invention, what I claim is:

1. The process of making hollow rubber articles having seams, consisting in cutting from uncured rubber sheets, two similar blanks of unequal size, edge-joining the blanks by causing the inner edge of the outer blank to adhere to the outer edge of the inner blank and vulcanizing the article so formed.

2. The process of manufacturing hollow rubber articles which consists in cutting blanks from uncured rubber sheets, one blank of slightly greater area than the other, superposing the smaller on the larger, turning over the projecting margin upon the smaller, and vulcanizing the whole.

3. The process of manufacturing hollow rubber articles which consists in cutting, from uncured rubber, blanks of slightly unequal area, centrally superposing the smaller upon the larger, coating with adhesive material the projecting margin of the larger blank, turning said margin over upon the smaller blank, and vulcanizing the whole.

4. The process of manufacturing rubber bag-bodies which consists in die-cutting two blanks from uncured rubber sheets similar in form but of slightly unequal area, superposing the smaller upon the larger, coating the margins of the blanks with adhesive material, overlaying the projecting margin upon the smaller blank, and vulcanizing the whole.

5. The process of manufacturing rubber bag-bodies which consists in forming with cutting and embossing dies sides or walls of uncured rubber similar in form but slightly unequal area, superposing the smaller upon the larger, folding the projecting margin over the edge of the smaller side, interposing a coating of adhesive material, and vulcanizing the whole.

6. The process of manufacturing rubber bag-bodies which consists in cutting from uncured rubber two sides or walls with parallel edges but with slightly unequal areas, centrally superposing the smaller upon the larger, coating with adhesive material the projecting margin of the larger side, folding said margin over the edge of the smaller side, uniting the edge-joint by pressure, and vulcanizing the whole.

7. The process of manufacturing rubber bag-bodies which consists in cutting from uncured rubber two sides or walls with parallel edges but slightly unequal in area, superposing the smaller upon the larger, coating with adhesive material the projecting margin of the larger side, folding said margin over the edge of the smaller side, applying a binding strip of rubber overlapping the joint edges uniting the strip and edge-joint, and vulcanizing the whole.

8. The process of manufacturing rubber bag-bodies which consists in cutting from uncured rubber two sides or walls having parallel edges but slightly unequal in area, superposing the smaller upon the larger, inserting a reinforcing strip between the adjacent sides, coating with adhesive material the projecting margin of the larger side, folding said margin over the edge of the smaller side, uniting the edge-joint, and vulcanizing the whole.

IRWIN FLOYD KEPLER.

Witnesses:
WILLIAM A. MEANS,
A. E. ROACH.